(12) United States Patent
Coon

(10) Patent No.: US 6,341,050 B1
(45) Date of Patent: Jan. 22, 2002

(54) SUSPENSION WITH MODIFIED LOAN BEAM FOR DYNAMIC PITCH CONTROL

(75) Inventor: Warren Coon, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

(21) Appl. No.: 09/894,101

(22) Filed: Jun. 27, 2001

Related U.S. Application Data

(62) Division of application No. 09/476,981, filed on Dec. 31, 1999.
(60) Provisional application No. 60/154,555, filed on Sep. 17, 1999.

(51) Int. Cl.[7] .................................................. G11B 5/48
(52) U.S. Cl. .................................................... 360/244.9
(58) Field of Search ............................ 360/244.2, 244.8, 360/244.9, 245

(56) References Cited

U.S. PATENT DOCUMENTS

| | | | | |
|---|---|---|---|---|
| 5,107,383 A | * | 4/1992 | Takeuchi et al. | 360/104 |
| 5,796,553 A | * | 8/1998 | Tangren | 360/104 |
| 5,835,307 A | * | 11/1998 | Sone | 360/104 |
| 5,991,122 A | * | 11/1999 | Tangren et al. | 360/104 |
| 6,115,220 A | * | 9/2000 | Khan et al. | 360/244.2 |

* cited by examiner

Primary Examiner—William Klimowicz
(74) Attorney, Agent, or Firm—Louis J. Bachand

(57) ABSTRACT

Optimum pitch attitude during and between slider contact with a disk in a disk drive is provided by articulating the suspension load beam rigid portion intermediate its ends to flex in the unloaded condition to provide a small positive pitch to the slider and to provide a 0° pitch in the loaded condition when the slider is in operating contact with the disk.

8 Claims, 3 Drawing Sheets

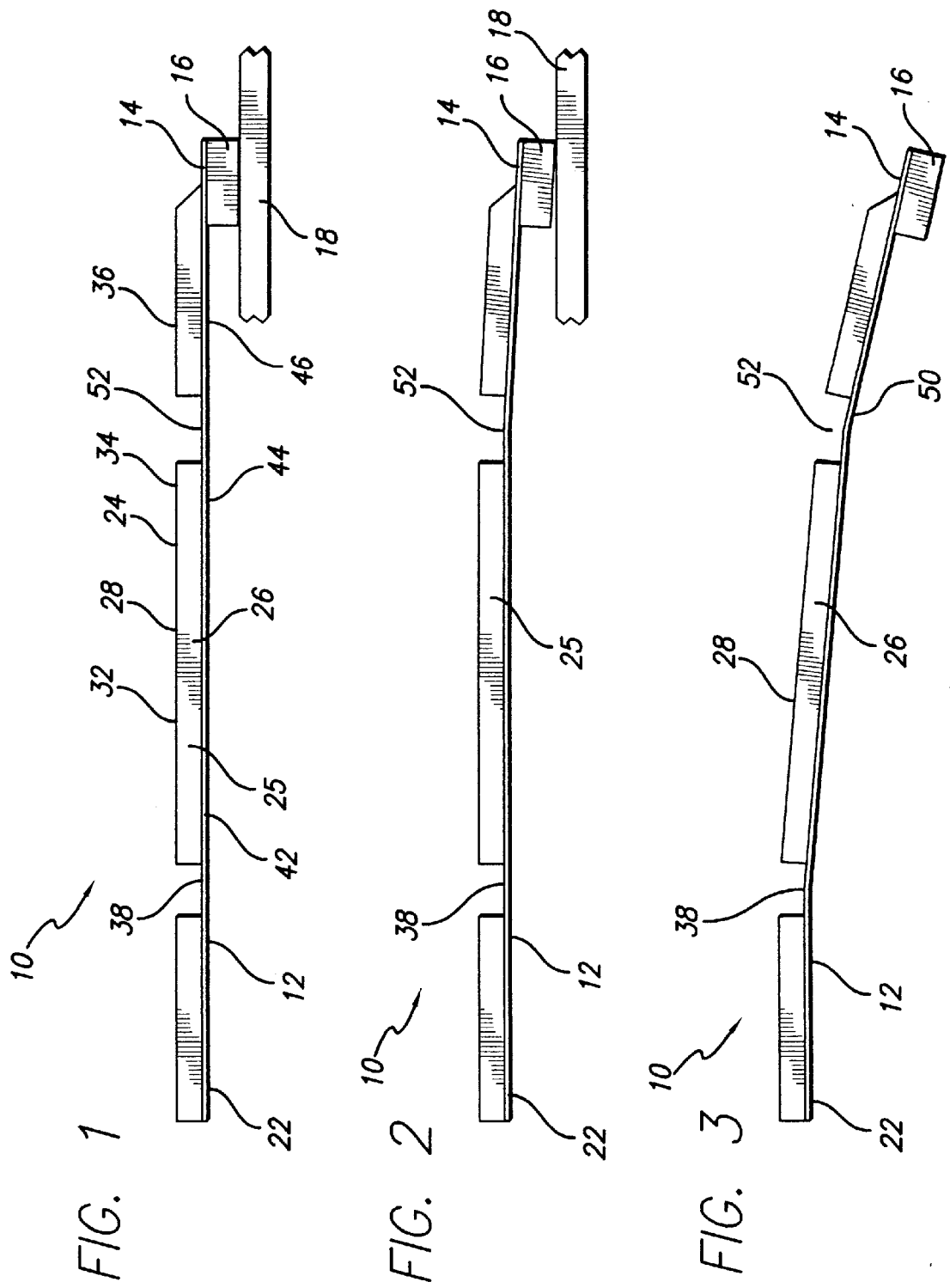

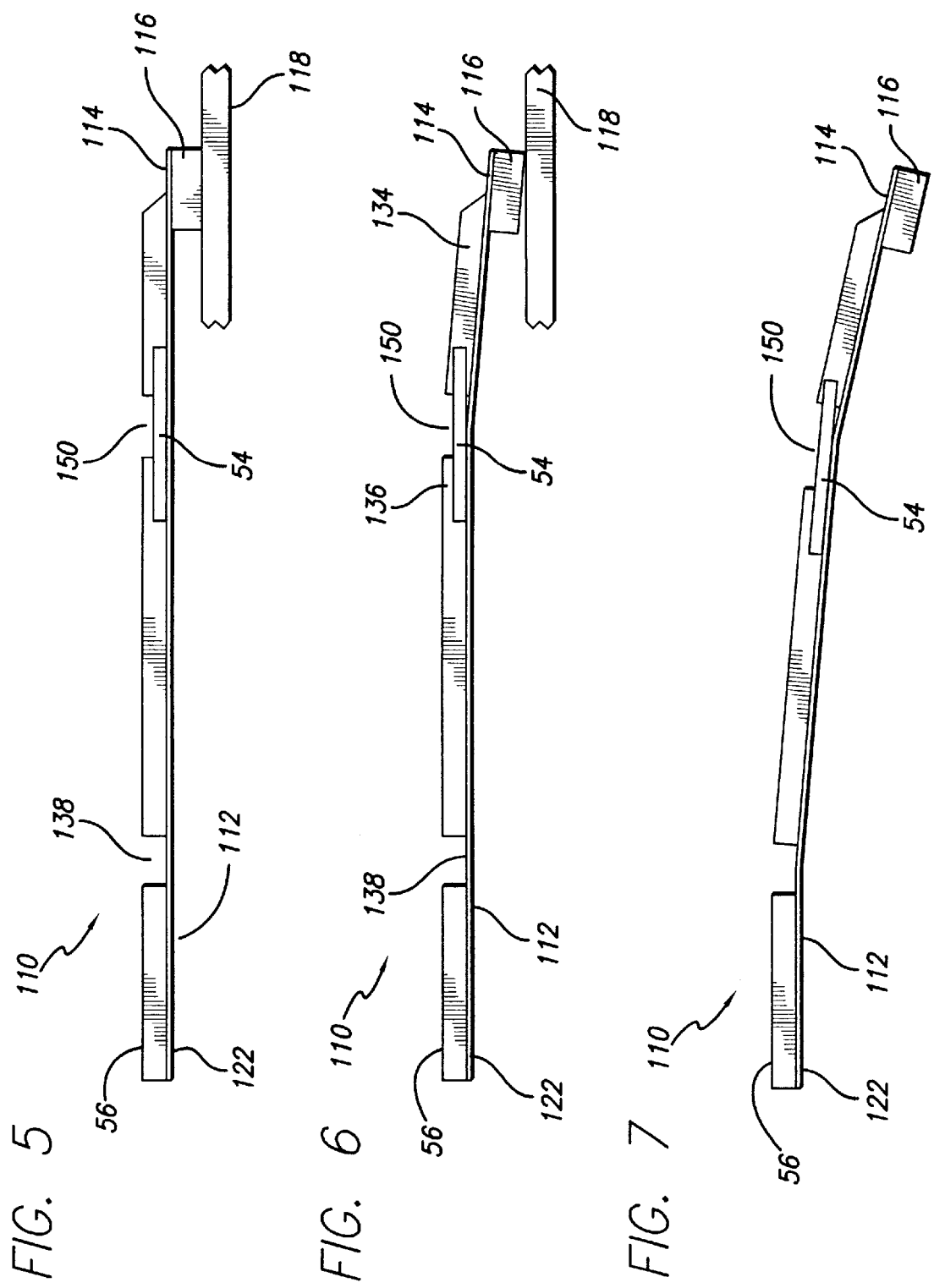

SUSPENSION WITH MODIFIED LOAN BEAM FOR DYNAMIC PITCH CONTROL

REFERENCE TO RELATED APPLICATIONS

This application is a division U.S. Pat. application Ser. No. 09/476,981 filed Dec. 31, 1999.

This application claims the benefit of U.S. Provisional Patent Application Ser. No. 60/154,555, filed on Sep. 17, 1999.

BACKGROUND OF THE INVENTION

1. Field of the Invention

This invention relates to disk drive suspensions, and, more particularly, to modified load beams in disk drive suspensions that flex at a locus of articulation intermediate the beam rigid portion ends to maintain the pitch static attitude of the slider at the optimum small positive angle when the slider in out of operative contact with the disk and at the optimum 0° when the slider is in operative contact with the disk. The term operative contact herein refers to the condition of the slider flying on the disk surface on a cushion of air in disk undulation following relation and does not include physical touching of the slider and disk surface.

2. Related Art

Disk drive use load beam to maintain the slider that carries the read write head in operative contact with the disk. Typically, the load beam through a spring portion exerts a force that brings the slider carried on the load beam rigid portion into a predetermined close spacing to the disk while the disk is spinning. When the disk is not spinning the slider is lifted away from the disk to a greater spacing. The slider must then be lowered when the disk spinning resumes.

SUMMARY OF THE INVENTION

Optimally, the slider when flying at the disk surface has a pitch angle that is 0° to a reference datum so that the slider face and the disk are parallel to each other. When the slider is lifted to or from the disk or suspended above the disk it falls to an angle that is a function of the angle of the flexure tongue that holds the slider and the angle of the load beam rigid portion to which the flexure is attached.

In this invention, the angle of the suspended slider is maintained at a small positive angle such as 1°. In this context positive means that the slider nose or leading face is up relative to the trailing face such that initial (and last) contact of the slider with the disk surface is by the lower trailing face edge and not the leading face edge.

In the prior art the effort to have the positive angle for load and unload has had to be compromised with the simultaneous need to have a 0° pitch angle during flying of the slider at the disk surface. In accordance with the invention, the previous compromises are no longer required.

It is an object of the invention, therefore, to provide an improved disk drive suspension. It is a further object to provide a modified load beam in a disk drive suspension that both supports the slider at a 0° when flying but also maintains the slider at a small positive pitch angle during load and unload cycles.

These and other objects of the invention to become apparent hereinafter are realized in a disk drive suspension comprising a load beam and a flexure carrying a slider for contact or not with a disk, the load beam comprising a base portion, a rigid beam portion having rigidity-imparting left and right edge rails each comprising rearward, forward and intermediate rail sections, and a spring portion between the base and rigid beam portions, the rigid beam portion having rearward, intermediate and forward beam sections corresponding to the rearward, forward and intermediate rail sections, respectively; the forward beam section extending the length of and mounting the flexure, the rearward beam section being attached to the spring portion, and the intermediate beam section having opposing left and right intermediate rail section discontinuities to reduce intermediate section rigidity there and form a locus of intermediate beam portion articulation rearward of the flexure, whereby the intermediate section flexes in response to slider contact or not with the disk to maintain the slider at a small positive pitch relative to the disk in the absence of disk operating contact and at a 0° pitch when in disk operating contact under spring portion loading.

In a further embodiment, the invention provides a disk drive suspension comprising a load beam and a flexure carrying a slider for contact or not with a disk, the load beam comprising a base portion, a rigid beam portion having rigidity-imparting left and right edge rails comprising rearward, forward and intermediate rail sections, and a spring portion between the base and rigid beam portions, the rigid beam portion having rearward, intermediate and forward beam sections corresponding to the rearward, forward and intermediate rail sections, respectively; the forward beam section extending the length of and mounting the flexure, the rearward beam section being attached to the spring portion, and the intermediate beam section having a locus of articulation formed by opposing discontinuities in the left and right intermediate rail sections, and a stiffener plate attached to the rearward beam section in intermediate beam section overlying relation to block overcenter movement of the intermediate portion relative to the rearward portion in the unloaded condition of the suspension, whereby the intermediate section flexes in response to slider contact or not with the disk to maintain the slider at a small positive pitch relative to the disk in the absence of disk operating contact and at a 0° pitch when in disk operating contact under spring portion loading.

In these and like embodiments, typically, the invention includes a mounting plate attached to the base portion, the rigid portion is of generally triangular shape, the edge rails converging toward the forward beam section, the load beam sections are formed on a single stainless steel web, and, the rail section discontinuities increase or decrease in width responsive to movement of the slider from or to the disk.

BRIEF DESCRIPTION OF THE DRAWINGS

The invention will be further described in conjunction with the attached drawings in which:

FIG. 1 is a side elevation view of a first embodiment of the invention with the slider in a loaded condition;

FIG. 2 is a side elevation view showing the slider at touchdown in a loading-unloading condition;

FIG. 3 is a side elevation view with load beam and slider in a free state;

FIG. 5 is a side elevation view thereof with the slider in a loaded condition;

FIG. 6 is a side elevation view showing the slider at touchdown in a loading-unloading condition; and, FIG. 7 is a side elevation view thereof with the load beam and slider in a free state.

DETAILED DESCRIPTION

Figure 4:
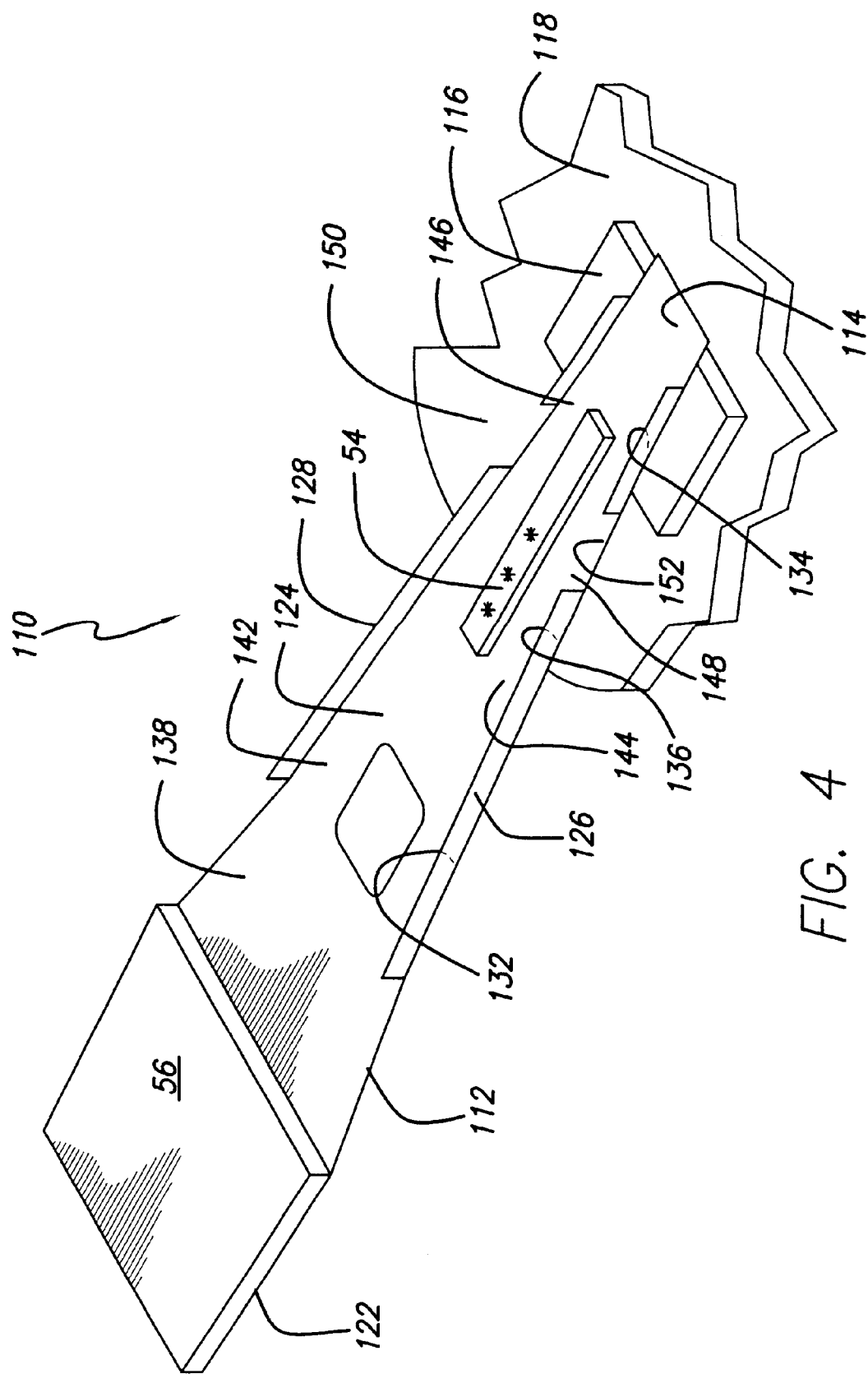
FIG. 4 is an oblique view of a second embodiment of the invention.

Pitch herein is the angle of the flexure relative to the mounting datum in the long axis of the suspension, regardless of whether this is the pitch direction of the slider or the roll direction. Pitch also refers to the pitch direction of the slider where the slider is mounted in the conventional direction, that is, where the long axis of the slider is parallel to the long axis of the suspension and not rotated 90° as sometimes is done. In the present discussion it will be assumed that the slider has the conventional orientation and that the slider pitch and the flexure pitch are therefore in the same direction.

In this invention, a flexing section is built into the load beam between the ends of the normally rigid portion. The slider end of the load beam, forward of the flexing section, has below it all the normally underlying parts below the flexure. The flexure, a zero degree PSA (pitch static attitude) type is thus mounted on a rigid, planar surface of the load beam as conventionally done. The flexing section is constructed such that the flexure mounting portion of the load beam is bent toward the disk (nose-up direction) a small amount, about +1°, when in its free state. See FIGS. 3 and 7. The load beam vertical stiffness is designed to be such that with the slider load force, typically about 5 grams, applied to the load beam, the flexing section straightens out (the rail discontinuities become smaller) to match the profile of a conventional, flexing section-free load beam. Thus when the slider is being loaded or unloaded the slider will have a nose-up or positive bias. But the pitch angle bias does not obtain when the slider is flying. The invention thus provides the best of both worlds: a zero bias, 0° pitch angle when flying and a small positive bias or about 1° pitch angle during loading and unloading.

With further reference now to the drawings, in FIGS. 1–3, the disk drive suspension 10 comprises a load beam 12 and a flexure 14 carrying a slider 16 for contact or not with a disk 18. The load beam 12 comprises a base portion 22, a rigid beam portion 24 having rigidity-imparting left and right edge rails 26, 28 each comprising rearward, intermediate and forward rail sections 32, 34 and 36 respectively. The load beam 12 further comprises a spring portion 38 between the base portion 22 and the rigid beam portion 24.

The rigid beam portion 24 is formed of a unitary, one-piece web 25 and has rearward, intermediate and forward beam sections 42, 44 and 46 respectively, corresponding to the rearward, forward and intermediate rail sections 32, 34 and 36.

The forward beam section 46 extends at least the length of and mounts the flexure 14. The rearward beam section 42 is seamlessly attached to the load beam spring portion 38. The intermediate beam section 44 has opposing left and right intermediate rail section discontinuities 48, 50 located, sized and shaped to reduce the intermediate section 44 rigidity there and form a locus 52 of intermediate beam portion articulation rearward of the flexure 14. The intermediate section will thus flex in response to slider 16 contact or not with the disk 18 to maintain the slider at a small positive pitch relative to the disk in the absence of disk operating contact and at a 0° pitch when in disk operating contact under spring portion 38 loading.

With reference to FIGS. 4–7, a further embodiment is shown in which like parts have like numerals plus 100, including a disk drive suspension 110 comprising a load beam 112 and a flexure 114 carrying a slider 116 for contact or not with a disk 118. The load beam comprises base portion 122, a rigid beam portion 124 having rigidity-imparting left and right edge rails 126, 128 each comprising rearward, forward and intermediate rail sections 132, 134 and 136, respectively. The load beam 112 further comprises a spring portion 138 between the base portion 122 and the rigid beam portion 124. The rigid beam portion 124 has rearward, intermediate and forward beam sections 142, 144 and 146 respectively corresponding to the rearward, forward and intermediate rail sections 132, 134 and 136.

The forward beam section 146 extends at least the length of and mounts the flexure and covers all underlying parts. The rearward beam section 142 is attached to the spring portion 138.

The intermediate beam section 144 has a locus of articulation 152 formed by opposing discontinuities 148, 150 in the left and right intermediate rail sections 134.

In this embodiment, too, a stiffener plate 54 is provided attached to the rearward beam section 142 in intermediate beam section 144 overlying relation to block overcenter (i.e. movement from its normal angular relationship to the rearward beam section to a zero angle, centered, and through to a like angle on the opposite side of the rearward beam section, or overcentered) movement of the intermediate beam section relative to the rearward section in the unloaded condition of the suspension 110. Thus, the intermediate beam section 144 flexes in response to slider 116 contact or not with the disk 118 to maintain the slider at a small positive pitch relative to the disk in the absence of disk operating contact and at a 0° pitch when in disk operating contact under spring portion 138 loading.

In both embodiments, the apparatus typically has a mounting plate 56 attached to the base portion 22, 122. The load beam rigid portion 24, 124 is of generally triangular shape, as shown, the edge rails 26, 28, 126, 128 converge toward the forward beam section 46, 146. The load beam sections 42, 44, 46 and 142, 144 and 146 are formed on a single stainless steel web 25, 125, and, the rail section discontinuities 48, 50 148, 150 increase or decrease in width responsive to movement of the slider 16, 116 from or to the disk 18, 118.

The invention thus provides an improved disk drive suspension having a modified load beam that both supports the slider at a 0° pitch angle when flying but also maintains the slider at a small positive pitch angle during load and unload cycles.

I claim:

1. A disk drive suspension comprising a load beam and a flexure carrying a slider for contact or not with a disk, said load beam comprising a base portion, a rigid beam portion having rigidity-imparting left and right edge rails comprising rearward, forward and intermediate rail sections, and a spring portion between said base and rigid beam portions, said rigid beam portion having rearward, forward and intermediate beam sections corresponding to said rearward, forward and intermediate rail sections, respectively; said forward beam section extending the length of and mounting said flexure, said rearward beam section being attached to said spring portion, and said intermediate beam section having a locus of articulation formed by opposing discontinuities in said left and right intermediate rail sections, and a stiffener plate attached to said rearward beam section in intermediate beam section overlying relation to block overcenter movement of said intermediate beam section relative to said rearward beam section in the unloaded condition of said suspension, whereby said intermediate section flexes in response to slider contact or not with said disk to maintain said slider at a small positive pitch relative to said disk in the absence of disk operating contact and at a 0° pitch when in disk operating contact under spring portion loading.

2. The disk drive suspension according to claim 1, including also a mounting plate attached to said base portion.

3. The disk drive suspension according to claim 1, in which said rigid portion is of generally triangular shape, said edge rails converging toward said forward beam section.

4. The disk drive suspension according to claim 1, in which said load beam sections are formed on a single stainless steel web.

5. The disk drive suspension according to claim 1, in which said rail section discontinuities increase or decrease in width responsive to movement of said slider to or from the disk.

6. The disk drive suspension according to claim 5, including also a mounting plate attached to said base portion.

7. The disk drive suspension according to claim 6, in which said rigid portion is of generally triangular shape, said edge rails converging toward said forward beam section.

8. The disk drive suspension according to claim 7, in which said load beam sections are formed on a single stainless steel web.

* * * * *

UNITED STATES PATENT AND TRADEMARK OFFICE
CERTIFICATE OF CORRECTION

PATENT NO. : 6,341,050  
DATED : January 22, 2002  
INVENTOR(S) : Warren Coon

Page 1 of 1

It is certified that error appears in the above-identified patent and that said Letters Patent is hereby corrected as shown below:

<u>Title page, Item [54], and Column 1, lines 1-2,</u>
Should read -- SUSPENSION WITH MODIFIED LOAD BEAM FOR DYNAMIC PITCH CONTROL --

Signed and Sealed this

Seventh Day of May, 2002

*Attest:*

*Attesting Officer*

JAMES E. ROGAN
*Director of the United States Patent and Trademark Office*